United States Patent
Nurse, Jr. et al.

(10) Patent No.: US 6,540,912 B1
(45) Date of Patent: Apr. 1, 2003

(54) AEROBIC POLISHING SYSTEM FOR WASTEWATER

(75) Inventors: Harry L. Nurse, Jr., 12207 Plantation Blvd., Goshen, KY (US) 40026; Theophilus B. Terry, III, Sonora, KY (US)

(73) Assignee: Harry L. Nurse, Jr., Goshen, KY (US)

( * ) Notice: Subject to any disclaimer, the term of this patent is extended or adjusted under 35 U.S.C. 154(b) by 40 days.

(21) Appl. No.: 09/718,317

(22) Filed: Jan. 22, 2000

(51) Int. Cl.[7] ............................. C02F 3/06; C02F 9/00
(52) U.S. Cl. ................. 210/202; 210/209; 210/220; 210/532.2
(58) Field of Search ............................ 210/201, 202, 210/203, 209, 220, 532.2

(56) References Cited

U.S. PATENT DOCUMENTS 3,440,669 A * 4/1969 Boester
3,543,294 A * 11/1970 Boester
3,807,565 A * 4/1974 Langston et al.

* cited by examiner

Primary Examiner—Thomas M. Lithgow
(74) Attorney, Agent, or Firm—Charles G. Lamb; James Daly, IV; Middleton Reutlinger

(57) ABSTRACT

An aerobic treatment system for wastewater is disclosed herein. The aerobic treatment system is comprised of a basin, which receives wastewater through an inlet pipe, the inlet pipe depositing the untreated wastewater to the lower portion of the basin. The wastewater must then flow from the lower portion of the interior of the basin through a fibrous filter and through an outlet filter to the outlet section of the aerobic treatment system. While resident within the lower portion of the basin, the wastewater is treated through aeration by an insertion of air through an air inlet pipe and diffusing the air within the untreated wastewater below the fibrous filter. The entire aerobic treatment system of the present invention is designed such that the filtering mechanisms may be readily removed or cleaned on a routine basis by the user. Further, the aerobic treatment system described herein adequately treats and lowers the bacterial count through aeration of the wastewater while the wastewater is resonant within the basin.

22 Claims, 2 Drawing Sheets

AEROBIC POLISHING SYSTEM FOR WASTEWATER

BACKGROUND OF THE INVENTION

1. Field of the Invention

The present invention relates in general to wastewater treatment systems and more particularly to an aerobic polishing treatment unit for wastewater. More particularly, the present invention relates to a redundant aerobic treatment system utilized to treat outflow wastewater from a primary treatment system or septic treatment system.

2. Discussion of the Prior Art

A large number of systems for treatment of contaminants in water, such as effluent from wastewater treatment facilities, are variously known in the prior art. Many of the various prior art type wastewater treatment facilities may utilize AeroDiffuser systems, septic tank or other designs, which are meant to reduce various bacterial, or contaminant counts within the effluent. A number of these prior art systems are considered to be advance treatment systems, which provide an initial treatment of effluent directly from the source. A number of these advance treatment systems or main treatment systems provide either initial or standard treatment within the septic system by taking the wastewater and lowering the appropriate bacterial count to an acceptable level.

However, some of these designs require additional or background treatment facilities due to the poor soil conditions, system capacities, bulk of material or other environmental circumstances in order to adequately treat the wastewater. This may be particularly the case when the resident time of the effluent within the standard septic treatment system is insufficient. Such background, post-treatment or 'polishing' facilities are used to catch overflow or to 'polish' treat the outflow from the main wastewater treatment facility. Polishing systems have typically been comprised of sand filters and are utilized for reduction of bacterial count or suspended solids from the effluent. These polishing filters are utilized to remove particulate and other material not caught by the primary filtering system.

SUMMARY OF THE INVENTION

The present invention therefore seeks to solve the above-mentioned problems and shortcomings of the prior art. In general, the present invention relates to a background aerobic polishing treatment system for wastewater fluid wherein the aerobic treatment unit treats the wastewater after primary treatment, such background treatment occurring within a basin through an aeration process. The polishing system for wastewater of the present invention then passes the treated wastewater to the outlet lines of the septic system.

The aerobic treatment system of the present invention may also be utilized in order to solve overflow problems from a main septic treatment system or to provide air infusion as a treatment to wastewater fluid. An additional use may reside in the ability of the polishing system of the present invention to rejuvenate a lateral field where the outflow of a septic tank has clogged or prevented further use thereof.

One object therefore of the present invention is to provide an aerobic polishing system for wastewater fluid wherein the unit of the present invention may be placed subsequent to a main wastewater treatment facility in order to treat the outflow from the wastewater treatment facility and ensure proper final treatment thereof.

An additional object of the present invention is to provide an aeration polishing treatment system for wastewater fluid wherein the wastewater is treated in order to adequately lower the bacterial count of the wastewater.

An even further object of the present invention is to provide an aerobic treatment system for wastewater wherein proper treatment of the wastewater may be completed when the entire wastewater treatment facility is located on either poor soil or in a small or confined area.

Another object of the present invention is to provide an aerobic polishing treatment system for wastewater wherein the aerobic treatment unit of the present invention utilizes a basin, which receives the wastewater, the wastewater treated by air injection and passed through an outlet filter and through a fibrous filter to the wastewater treatment outlet line.

An additional object of the present invention is to provide an aerobic polishing treatment system for wastewater wherein the aerobic treatment unit of the present invention may be utilized in series as a primary treatment facility if needed.

Moreover, an additional object of the present invention is to ensure lower bacterial count of the wastewater fluid by use of the aerobic polishing treatment system for wastewater shown herein and which may provide three additional stages of filtering and treatment. The wastewater treatment unit utilizes a compressor to inject air into the aerated wastewater contained within a basin. The aerated wastewater must first flow through a fibrous filter in order to reach the outlet filter. The outlet filter is interposed between the fibrous filter and the outlet line so that the aerated wastewater is filtered prior to flowing through the outlet lines.

The aerobic polishing treatment system for the present invention ensures that the bacterial count for the wastewater coming from a primary wastewater treatment facility may be additionally reduced in order to meet proper environmental criteria.

Arrangements within the scope of the present invention provide further advantages in that the aerobic treatment system for the present invention, which retains the aerated wastewater, may be located in different positions within a primary wastewater treatment facility or may be placed in series as a primary treatment facility.

Examples of arrangements within the scope of the present invention are illustrated in the accompanying drawings and described hereinafter but it will be understood that neither the drawings nor the descriptions hereof are presented by way of limitation in that other arrangements also within the scope of the present invention will appear to those skilled in the art upon reading the disclosure set forth herein.

DETAILED DESCRIPTION OF THE PREFERRED EMBODIMENT

Figure 1:
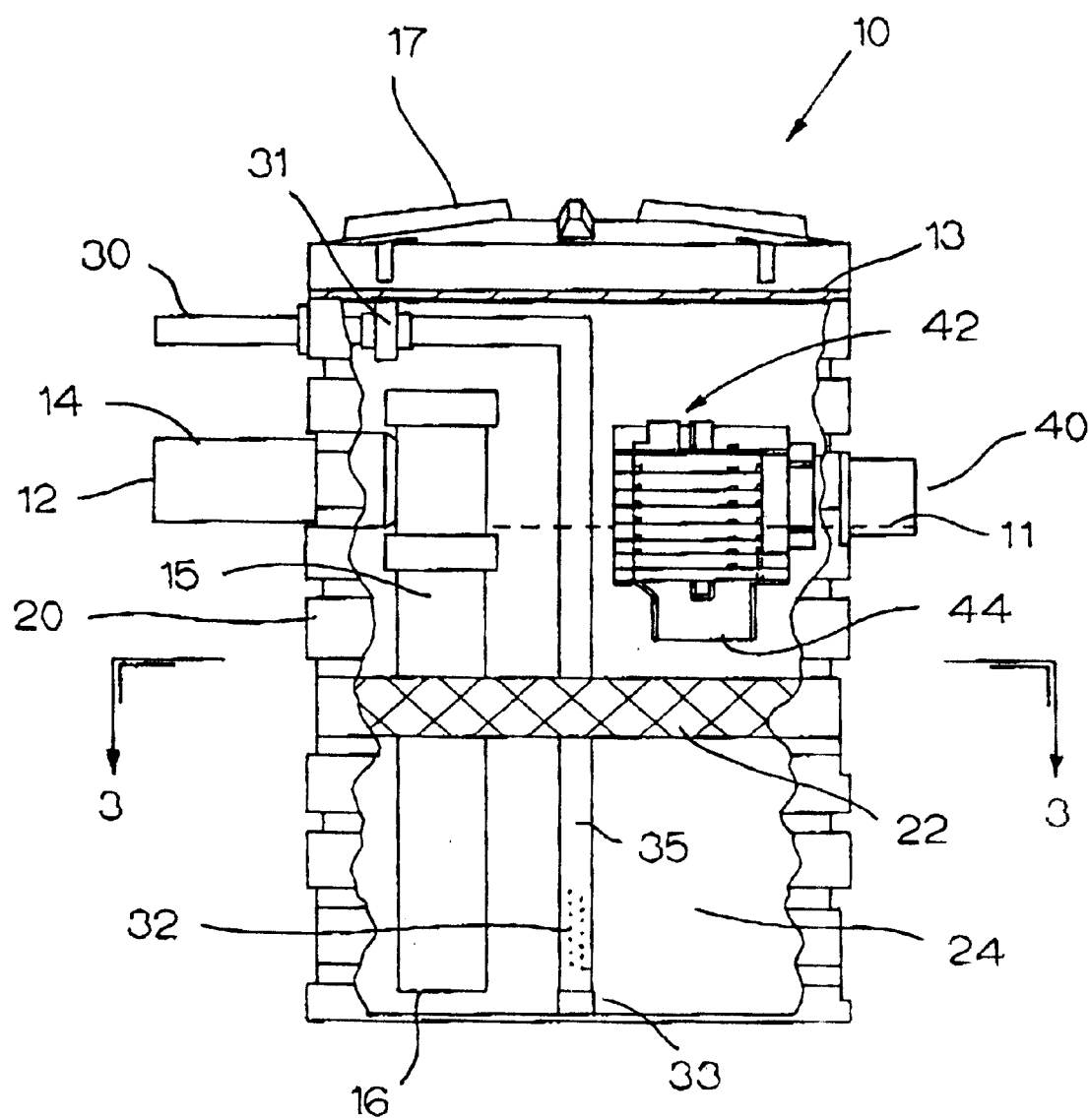
FIG. 1 is a cross-sectional view of the aerobic treatment system for wastewater fluid of the present invention.

The aerobic polishing treatment system for wastewater 10 of the present invention is shown in FIG. 1 in cross section. In the design shown in FIG. 1, the system is mostly retained within a basin 20 which may be a large cylindrical barrel type basin to retain the aerated wastewater 24 located in the bottom portion of basin 20. The basin 20 has several inlets which allow both wastewater and air to flow into the interior of the sealed basin. Additionally, the basin 20 has a removable lid 17 which may be snapped or threadably retained on the top portion thereof for access to the interior of the aerobic polishing treatment system 10 of the present invention. The basin 20 as depicted in FIG. 1 may be of a barrel type design and may be made of a plastic or other leak proof material such that the aerated wastewater contained within the lower portion of the basin 20 is retained therein without spillage or leakage. As shown in FIG. 1, the basin may be, for example, a container which has a volume of approximately 75 or 80 U.S. gallons, only a portion of which contains the aerated wastewater 24 in the lower portion thereof. The aerated wastewater 24, as depicted in FIG. 1, may fill only a portion of the basin 20 such as, for example, approximately 30 gallons or slightly more for treatment by the aerobic polishing treatment system of the present invention.

The basin 20 has an inlet pipe 14, which has an open inlet area 12. Inlet pipe 14 enters into the interior of the basin 20 and allows the wastewater to flow there through. Inlet pipe 14, including the inlet portion 12 thereof, allows the wastewater to enter into vertical pipe portion 15 and exit through the inlet pipe outlet section 16 found at the lower area of the interior basin 20. Inlet pipe 14 may be made of a PVC material or other similar plastic in order to adequately carry the wastewater to the lower interior of basin 20. The inlet section or area 12 of inlet pipe 14 may be connected to the outlet of septic system or other type of advance treatment system and will receive the mostly or partially treated wastewater for further treatment. Thus, the aerobic polishing treatment system 10 of the present invention may be placed in series with other wastewater treatment systems in order to further aerate and treat the wastewater fluid flow thereby fully reducing bacterial and suspended particulate material therein.

Figure 3:
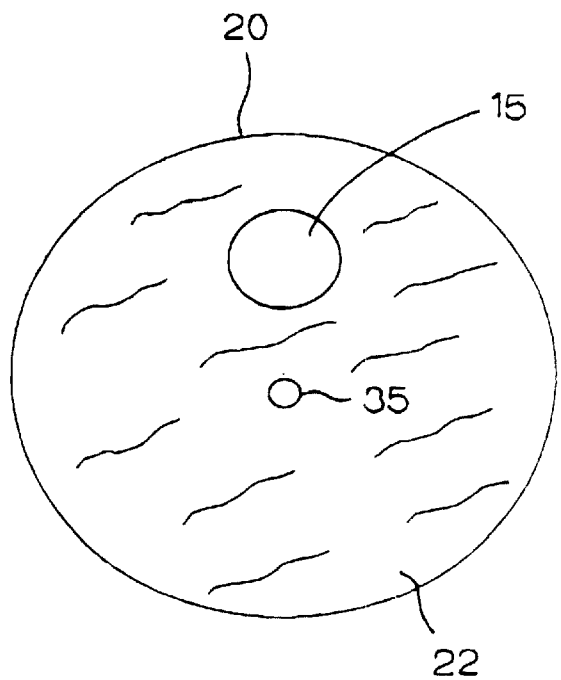
FIG. 3 is a top sectional view of the aerobic treatment system depicted in FIG. 1.

As can be seen in FIG. 1, the wastewater flows into the interior of the basin 20 through the inlet section 12 of inlet pipe 14 and is deposited in the lower section of the basin 20 through the outlet portion 16 of the inlet pipe. The vertical section 15 of the inlet pipe allows the wastewater to by-pass the fibrous filter 22 located in the interior of the basin 20. Shown in conjunction with FIG. 1, FIG. 3 depicts a top view of the construction wherein the vertical pipe portion 15 allows the wastewater to descend to the bottom portion of the basin wherein the fibrous filter 22 separates the treated and untreated sections of the wastewater 24.

In addition to the vertical pipe portion 15 of inlet pipe 14, air supply tube 35 is provided in order to provide airflow to the interior of basin 20 into the aerated wastewater 24. The air supply tube 35 is connected at the air inlet 30 to a compressor or other device, which injects air into the interior of the basin and through air diffuser holes 32 found in the bottom section of air supply tube 35. As previously indicated, the lower portion of basin 20 contains the aerated wastewater 24 and the air supply tube 35 provides a continuous flow of air for aeration treatment of the wastewater contained therein. Further, a quick disconnect valve 31 is provided between the air inlet and the air diffuser 32 in order to disconnect the compressor or air supply vehicle from the air supply tube 35. This disconnect valve may be useful when entry into the interior of the basin 20 is required for servicing or cleaning. Thus, the compressor may be disconnected and thereby prevented from supplying additional air into the interior of the basin 20 by disconnecting the air supply tube at the disconnect valve 31. Also found at the lower end of air supply tube 35 is cap 33 in order to close off the air supply tube and force the supplied air through air diffuser apertures 32.

As shown in FIG. 1, the air supply tube 35 is provided so that fresh air is injected into the wastewater 24 in order for proper aeration treatment of the wastewater to be conducted. By continual application of air through the air diffuser 32, bacterial and other elements may be removed and the content lowered within the wastewater 24 through known aeration techniques. Further, air which is injected into the basin 20 through the air supply tube 35 is vented the standard plumbing vent pipes of the septic system or through the outlet 40.

As depicted in FIG. 1, separating the lower portion of the aerated wastewater 24 and the upper treated portion is fibrous filter 22. Fibrous filter 22 is an extremely fine filtration mat for separation of solids and other material from the lower portion to the upper portion, the upper area of the aerated wastewater flowing to the outlet 40 of the basin 20. Fibrous filter 22 may be made of a carbon, polyester or other plastic fine mesh material and may be replaced or cleaned on a regular basis during operation of the aerobic treatment system 10 of the present invention. Fibrous filter 22 allows the solids to remain in the lower section of the basin 20 and prevent the solids from flowing through the outlet filter 42 and outlet pipe 40. The fibrous filter 22 is designed such that it prevents solid particulate material to flow from the lower portion of the basin 20 and will also act to properly filter wastewater within the polishing system of the present invention. Further, the outlet mesh filter 22 may be comprised of a carbon material, which adds to the denitrification of the effluent. The filter utilized may be a carbon impregnated fiber filter such as that manufactured by BON-AIRE Filters, Inc. of Marietta, N.C. The de-nitrification aspect resulting from the inclusion of the carbon based filter in the polishing system of the present invention avoids the requirement of having additional de-nitrification systems commonly found in wastewater treatment systems. Thus, the polishing filter of the present invention provides a three-stage filtration capability; oxygenation, fibrous filter 22 and lo outlet filter 42 in addition to the de-nitrification abilities of a carbon based filter element 22.

As depicted in FIG. 1, the wastewater level has a water level 11 depicted so that water flows through the inlet and through the vertical pipe portion 15. The water level 11 is such that water flows to the outlet 40, which is placed slightly lower than the inlet section 12. Thus, the water flow typical for use of the aerobic polishing treatment system of the present invention is such that wastewater flows through the inlet 12, down vertical pipe portion 15 by-passing the fibrous filter 22, through the outlet 16 of inlet pipe 14, upward through the fibrous filter 22 and through the inlet 44 of outlet filter 42. The water flow will then pass through the outlet filter 42 into the outlet 40 which passes the water through to either further treatment or to standardized lateral fields for dispersion of treated wastewater.

Figure 2:
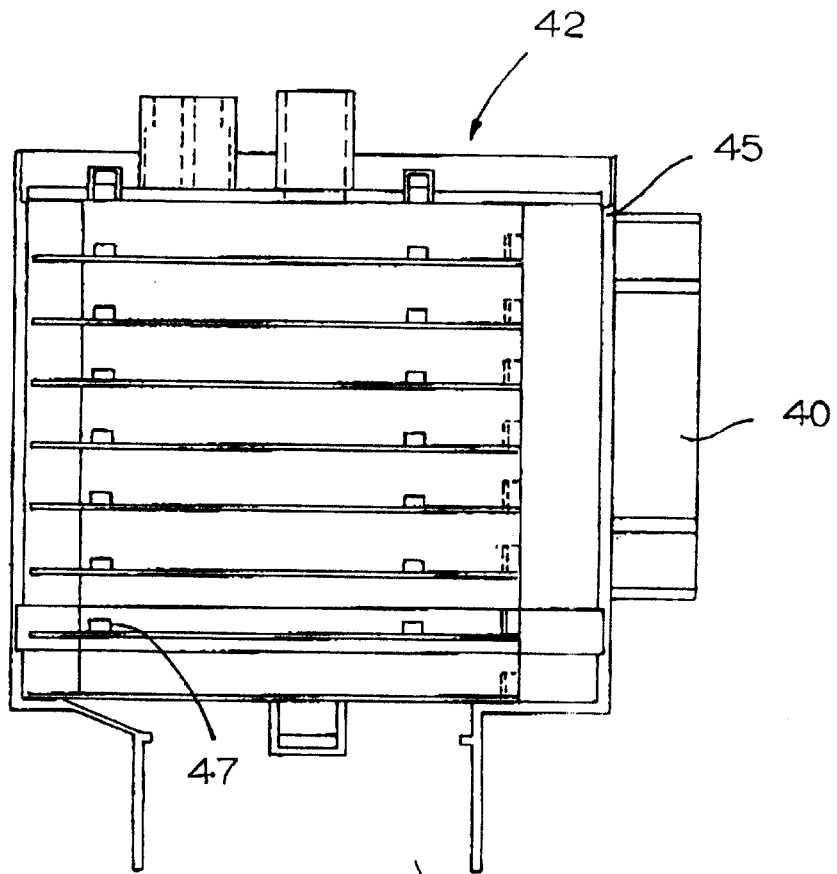
FIG. 2 is a close-up cross sectional view of the outlet filter for the aerobic treatment system shown in FIG. 1.

The outlet filter 42 of the present invention is depicted in FIG. 1 and in FIG. 2 wherein an inlet section 44 allows the treated wastewater to flow upward and through the outlet section 40. Outlet filter 42 further treats the aerated wastewater to remove particulate material, which has bypassed the fibrous filter 22. Outlet filter 42 of the present invention, as is depicted in FIGS. 1 and 2, has an outer wall 45 surrounding it allowing effluent fluid flow to enter upward through the inlet 44 and through the plurality of small openings 47 formed on the inner wall. The openings form weir or small dam type openings and effectively remove solid material from the effluent flow. As the fluid passes through the inner wall and openings 47 to the outlet 40, the filtered and treated water exits the polishing filter system of the present invention.

The outlet filter 42 of the present invention which is placed in the interior of the basin 20 is designed so that it may be removed from the interior of the basin after removal of lid 17. The outlet filter may then be cleaned in order to further remove particular material or other deposits which are formed or may accumulate therein.

The basin 20 of the aerobic treatment system of the present invention has a removable lid 17 for entry of the interior thereof. The removable lid may be threaded on or snap fitted or clamped on to the top portion of the basin. The lid 17 may be separated from top rim of the basin 20 by a gasket 13 in order to provide a water tight seal between the basin 20 and lid 17. Thus, the gasket 13 which may be neoprene or other similar malleable material provides a water tight seal and prevents the leakage of wastewater from the interior of the basin.

As can be seen in FIG. 1, the water flow into the interior of the basin 20 follows a path through inlet 12. The actual water level and also the resident time of the aerated wastewater 24 within the basin 20 depends on the use and volume of wastewater flowing through inlet 12 and also potentially on other environmental or waste characteristics. Thus, during high use, the fluid may remain in the container for only a short period of time. However under normal use circumstances, the wastewater will be aerated for a predetermined and limited time in order to properly remove bacteria and other elements through aerobic treatment of the wastewater. Further, the aerobic polishing treatment system 10 of the present invention may be provided in series with a multiple number of the units 10 connected together so that continual treatment of the wastewater in a plurality of basins is conducted. Further, the air supplied through air inlet 30 is provided by a compressor or other mechanism to inject air through the air supply tube 35. The compressor supplies air continually to the interior of the basin 20. The compressor, which is not shown, may be used to supply a large number of units 10 or may be utilized in a primary aeration treatment unit. Thus, for adequate air and fusion treatment of the wastewater, effluent flows into the interior of a single or a plurality of air treatment systems 10 of the present invention.

The aerobic treatment system 10 of the present invention may also be utilized as an overflow catch from a main wastewater treatment or septic system in order to ensure that, should there be an overflow of untreated wastewater, air infusion treatment of the wastewater will be implemented in order to reduce the bacteria and solid level of the fluid. Thus, as a secondary or redundant unit, the aerobic treatment system 10 of the present invention may be utilized to either lower bacterial count to an adequate level or prevent untreated overflow effluent to be dispensed to lateral lines or other septic fields.

While examples within the scope of the present invention are shown and discussed with reference to wastewater treatment it will be understood that devices within the scope of the present invention can be equally effectively used in other applications such as for example treatment of drainage water or other wastewater treatment systems in different form or format.

It is also understood that the forgoing examples are not by way of limitation of the present invention in that other arrangements within the scope of the present invention will occur to those skilled in the art upon reading the disclosure set forth herein.

What is claimed is:

1. An aerobic polishing system for treatment of wastewater, comprising: a basin having an upper and a lower portion; a wastewater inlet pipe, said wastewater inlet pipe extending into the interior of said basin and downward to said lower portion thereof; an outlet pipe, said outlet pipe extending to the interior of said basin and having an outlet filter formed thereon; an air supply tube extending into the interior of said basin; and, a fibrous filter separating said inlet pipe and said outlet filter.

2. An aerobic treatment system for wastewater having a plurality of treatment units, each of said units comprising: a retention basin, said retention basin having an upper section and a lower section, a wastewater inlet pipe, said wastewater inlet pipe extending into said basin downward to said lower portion thereof, an outlet pipe, said outlet pipe extending to the interior of said basin and having an outlet filter formed thereon, an air supply tube extending into the interior of said basin, and a filter separating the said inlet pipe and said outlet filter, wherein each of said plurality of treatment units are placed in series and having an inflow and an outflow, the outflow of each of said interconnecting units receiving the outflow of the immediate preceding unit.

3. The aerobic polishing system of claim 1 wherein said fibrous filter separates said lower portion from said upper portion.

4. The aerobic polishing system of claim 3 wherein said fibrous filter is interposed between said outlet filter and said lower portion of said basin.

5. The aerobic polishing system of claim 1 wherein said air supply tube extends into the interior of said basin into a bottom portion thereof, said air supply having a lower section, said lower section having a plurality of apertures formed therein.

6. The aerobic polishing system of claim 5 wherein said air supply tube extends downward through said fibrous filter and further wherein said plurality of apertures are formed on said air supply tube below said fibrous filter.

7. The aerobic polishing system of claim 1 wherein said fibrous filter is an extremely fine filtration filter.

8. The aerobic polishing system of claim 7 wherein said fibrous filter is a carbon filter.

9. The aerobic polishing system of claim 1 wherein said outlet filter has an inlet area and an outlet area, said outlet area having a plurality of filtering apertures formed therein.

10. The aerobic polishing system of claim 1 wherein said basin further comprises a removable lid, said basin having an open top and said removable lid placed on said open top.

11. The aerobic polishing system of claim 1 wherein said inlet pipe is further comprised of a horizontal inlet section and a vertical pipe portion, said vertical pipe portion ending at an open outlet.

12. The aerobic polishing system of claim 11 wherein said open outlet is below said fibrous filter.

13. The aerobic polishing system of claim 1 wherein said inlet pipe enters into the interior of said basin at a predetermined height, said predetermined height above said outlet.

14. An aeration background treatment system for wastewater which receives outflow from a primary treatment system, comprising: a basin having an upper and a lower portion for retaining wastewater, in an inlet pipe extending into the interior of said basin downward to said lower portion thereof, an air inlet supply tube extending into the interior of said basin and connected at the opposite distal end to an air infuser, an outlet pipe, and a fibrous filter, wherein said inlet pipe is further comprised of an outlet area, said fibrous filter interposed between said outlet area of said inlet pipe and said outlet pipe.

15. The background treatment system of claim 14 further comprising an outlet filter affixed to said outlet pipe.

16. The background treatment system of claim 15 wherein said outlet filter has an open inflow inlet, an outer wall and an inner wall, said inner wall forming a cavity, said cavity in flow communication with said basin, said inner wall having a plurality of flow through apertures formed therein.

17. The background filter of claim 14 wherein said fibrous filter is comprised of a carbon based mesh filter.

18. The background filter of claim 14 further comprising wherein said air infuser is an air compressor.

19. The background filter of claim 14 wherein said air inlet supply tube has a plurality of air diffuser apertures formed therein.

20. The background filter of claim 19 wherein said fibrous filter has a first aperture and a second aperture, said air inlet supply tube extending through said first aperture, said inlet pipe extending through said second aperture.

21. The background filter of claim 20 wherein said inlet pipe extends into the interior of said basin at a predetermined height, said predetermined height above said outlet pipe.

22. An aerobic treatment system for treatment of wastewater, comprising:
- a retention basin, said retention basin having an upper section and a lower section;
- an inlet pipe extending into the interior of said basin and downward to said lower portion;
- an air supply tube extending into the interior of said basin and supplying air to said lower portion of said basin through a plurality of air infusion apertures;
- an outlet pipe;
- an outlet filter affixed to said outlet pipe in the interior of said basin;
- a fibrous filter retained within the interior of said basin dividing said upper section from said lower section;
- wherein said inlet pipe has an outlet aperture, said fibrous filter interposed between set outlet aperture and said outlet filter.

* * * * *

UNITED STATES PATENT AND TRADEMARK OFFICE
CERTIFICATE OF CORRECTION

PATENT NO. : 6,540,912 B1
DATED : April 1, 2003
INVENTOR(S) : Harry L. Nurse and Theophilus B. Terry, III It is certified that error appears in the above-identified patent and that said Letters Patent is hereby corrected as shown below:

<u>Title page,</u>
Item [22], delete the file date "Jan. 22, 2000" and insert -- Nov. 22, 2000 --.

Signed and Sealed this

Twenty-eighth Day of October, 2003

JAMES E. ROGAN
*Director of the United States Patent and Trademark Office*